Figure 1:
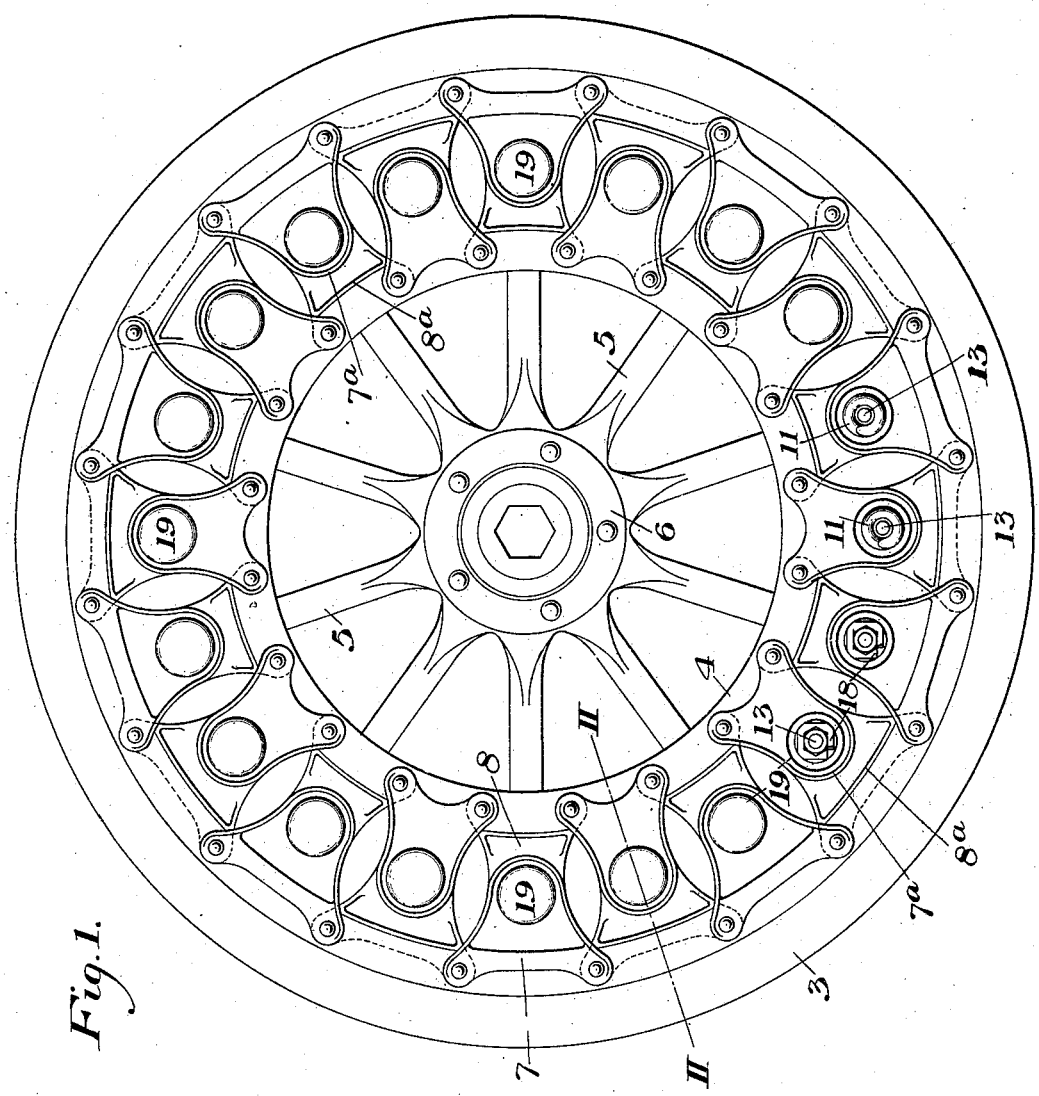

C. A. LINDSTRÖM.
VEHICLE WHEEL.
APPLICATION FILED SEPT. 6, 1906.

937,618.

Patented Oct. 19, 1909.
2 SHEETS—SHEET 1.

WITNESSES

INVENTOR

C. A. LINDSTRÖM.
VEHICLE WHEEL.
APPLICATION FILED SEPT. 6, 1906.
937,618.
Patented Oct. 19, 1909.
2 SHEETS—SHEET 2.
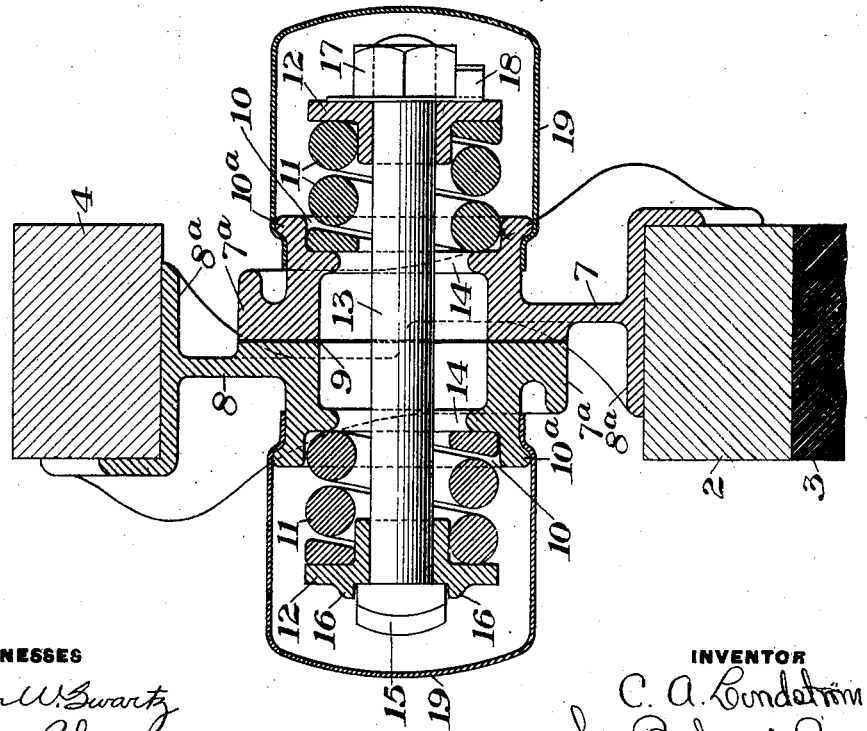
WITNESSES
Warren W. Swartz
G. B. Blorning
INVENTOR
C. A. Lindström,
by Bakewell & Byrnes,
his Attys.

UNITED STATES PATENT OFFICE.

CHARLES A. LINDSTRÖM, OF ALLEGHENY, PENNSYLVANIA.

VEHICLE-WHEEL.

937,618.

Specification of Letters Patent.   Patented Oct. 19, 1909.

Application filed September 6, 1906.   Serial No. 333,471.

*To all whom it may concern:*

Be it known that I, CHARLES A. LINDSTRÖM, of Allegheny, Allegheny county, Pennsylvania, have invented a new and useful Improvement in Vehicle-Wheels, of which the following is a full, clear, and exact description, reference being had to the accompanying drawings, forming part of this specification, in which—

Figure 1 is a side elevation of a vehicle wheel embodying my invention, the spring casings, housings or coverings being removed from two of the springs to show the seat for the outer end of the springs, and the casings or housings being removed from two other springs together with the seats for the outer ends thereof, in order to show the springs themselves; Fig. 2 is a section on the line II—II of Fig. 1; and Fig. 3 is a similar view showing the positions assumed by the parts when subjected to load.

My invention has relation to the class of vehicle wheels, and more particularly to resilient wheels of the general character shown in the patent to Seaton, No. 814,737, dated March 13, 1906, in which a series of horizontally-disposed springs are arranged between an inner and an outer rim. My invention is designed to retain the advantages due to the horizontal arrangement of the springs of the Seaton wheel; but to improve the arrangement and action of the springs, and more particularly to so arrange the springs that they will act by compression instead of tension; to prevent bending or distortion of the plates or bracket members which form the seats for the springs; to provide means for limiting the movement of the inner rim; and to prevent the cutting or wearing action of the bolts which carry the springs.

Other objects and advantages of my invention will hereinafter appear.

In the accompanying drawings, the numeral 2 designates the outer rim of the wheel upon which is seated a tire 3 of any suitable or usual form.

4 indicates the inner rim which is connected by the spokes 5 with the hub 6.

Secured to the outer rim 2 and projecting radially inward therefrom toward the inner rim, are a series of bracket or bearing plates 7, and secured to the inner rim 4 and extending radially outward toward the outer rim is a second series of corresponding bearing plates or brackets 8. One half of the brackets 7 and 8 are located on the rims on the one side of the wheel, and the other one half on the other side, so that every other bracket will be on the opposite side of the wheel on each rim. These brackets 7 and 8 are each formed with a broad annular bearing face 9, the bearing faces of each opposing pair of plates being normally out of contact with each other, as shown in Fig. 2. That is, when the two rims are concentric and the springs horizontal there is sufficient stiffness in the brackets to prevent a hard bearing between these surfaces, but when the load is increased beyond the stability of the brackets they support each other and friction is created between the surfaces. Each bracket is also provided with a seat 10 for the inner end of a spring 11, one of these springs being seated at its inner end against each bracket, the outer ends of the springs being seated against bearing plates or caps 12 on the end portions of bolts 13 which extend through the springs and through openings 14 in the brackets 7 and 8. The bolts or links 13 are preferably provided at one end with a head 15 which is prevented from turning by its engagement with lugs or lips 16 on the outer face of the adjacent spring seat 12, and at the other end with a nut 17 provided with any suitable locking device 18. Each of the brackets 7 and 8 is provided with a stop flange $8^a$ designed to be engaged by the end portion $7^a$ of the adjacent opposing bracket 7 or 8 in the manner shown in Fig. 3, and as more fully hereinafter described, for the purpose of limiting the movement of the inner rim. The openings 14 in the plates or brackets 7 and 8 are of considerably larger diameter than the diameter of the bolt 13 in order to permit the latter to assume an angular position, such as indicated in Fig. 3. The spring-seating portion 10 of each of the brackets or bearing plates 7 and 8 is provided with a beaded flange $10^a$ on a laterally projecting portion to receive the inner end of a spring casing or housing 19 forced thereover, and which protects the spring from dirt, weather, etc. As the springs are successively subjected to maximum load during the revolution of the wheel, it will be readily seen that the movement of the inner rim will tend to effect a compression of the springs as shown in Fig. 3, the bolts 13 being forced into an angular position, and the bearing faces 9 of the brackets 7 and 8 being brought into contact with each other. The engagement of these bearing faces prevents the brackets or plates from becoming bent or distorted, and the extent of their bearing surface is so large that the wear due to their frictional movement upon each other, is very slight. It will furthermore be apparent that owing to the horizontal distance between the inner ends of the two springs of each pair, an increased compression leverage is exerted upon the springs when the brackets are moved from their normal position, and consequently there is an increased friction between the bearing faces 9 which causes an easy retarding influence upon the further movement of the inner rim, and further that the greater this distance is the greater will be the pressure on the springs, etc. The bolts 13 being entirely out of contact with the bearing plates or brackets 7 and 8, are not subject to any cutting or wearing action due to their constant movement in action. In case of excessive load, the outer plate or bracket 7 is moved to a sufficient extent to cause its end edge 7ª, to engage the stop flange 8ª of the inner plate or bracket 8, the similar flange of the plate 8 engaging the flange of the plate 7 thereby preventing the further compression of the springs and injury of the parts. This contact, however, takes place under the full cushioning action of the springs, so that no jar or blow arises therefrom.

Various changes may be made in the details of the construction, and arrangement of the parts, since

What I claim is:—

1. A vehicle wheel having a series of pairs of overlapping plates independent and separate from each other, detachably connected to and interposed between the hub and rim in sliding engagement with each other, and means for creating friction between said plates or brackets.

2. A vehicle wheel having a series of pairs of overlapping plates independent and separate from each other, detachably connected to and interposed between the hub and rim having a sliding engagement with each other, and each extending outwardly over the other to form stops limiting their relative movement, in combination with spring means for creating friction between said members for resisting such relative movement.

3. A wheel having a series of pairs of overlapping brackets interposed between the hub and felly and having a sliding engagement with each other, means for limiting the sliding relative movement of said brackets, springs carried by said brackets on opposite sides thereof, and means passing through said brackets connecting the opposite ends of said springs.

4. A wheel having a series of pairs of overlapping members interposed between the hub and felly and having a sliding engagement with each other, means for limiting the relative movement of said members, spring sockets formed in the opposite faces of said members, springs seated in said sockets, and a connecting link passing through said members and connecting the opposite ends of said springs to create friction between said members during their relative movement.

5. A wheel having a series of overlapping pairs of members connecting the felly to the central portion of the wheel and having a sliding engagement with each other, and having enlarged central perforations and formed with spring sockets on their exterior faces, springs seated in said sockets, connecting links passing through said perforations and of relatively smaller diameter than said perforations, and means connecting opposite ends of said links to said springs.

6. A wheel having a plurality of overlapping felly-supporting members having a limited sliding frictional engagement with each other and having enlarged perforations, springs mounted on the non-engaging faces of said members and a link connecting opposite ends of said springs and passing through said perforations, said link being of small enough diameter to avoid engagement with the edges of said perforations when said members are at the limit of their sliding engagement.

7. A wheel having overlapping members interposed between the hub and felly or rim and having a frictional sliding engagement in combination with springs mounted on the exterior faces of said members and links connecting said springs operative upon relative movement of said members to increase the spring compression and friction between said members.

8. A wheel having a series of pairs of overlapping members interposed between the felly and the hub a member of each pair having a lateral projection, a link connecting said members and permitting their relative movement and a spring and housing both mounted concentrically to said link in its normal position said housing being mounted on said projection.

9. In a wheel, an inner and outer rim, projections mounted on one of said rims and formed with laterally-disposed spring housing seats, movable connections between said projections and the other rim, springs on said connections and spring housings mounted on said seats and inclosing said springs.

In testimony whereof, I have hereunto set my hand.

CHARLES A. LINDSTRÖM.

Witnesses:
T. B. DENHAM,
H. B. FISHER.